United States Patent
Malewicki et al.

(10) Patent No.: US 12,061,552 B2
(45) Date of Patent: *Aug. 13, 2024

(54) APPLICATION OF A DEFAULT SHARED STATE CACHE COHERENCY PROTOCOL

(71) Applicant: Hewlett Packard Enterprise Development LP, Spring, TX (US)

(72) Inventors: Michael Malewicki, Chippewa Falls, WI (US); Thomas McGee, Chippewa Falls, WI (US); Michael S. Woodacre, Lytham (GB)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/315,806

(22) Filed: May 11, 2023

(65) Prior Publication Data
US 2023/0281127 A1    Sep. 7, 2023

Related U.S. Application Data

(63) Continuation of application No. 17/230,286, filed on Apr. 14, 2021, now Pat. No. 11,687,459.

(51) Int. Cl.
*G06F 12/08* (2016.01)
*G06F 12/0808* (2016.01)
(Continued)

(52) U.S. Cl.
CPC ...... *G06F 12/0817* (2013.01); *G06F 12/0808* (2013.01); *G06F 12/084* (2013.01); *G06F 12/1441* (2013.01)

(58) Field of Classification Search
CPC ............... G06F 12/0808; G06F 12/084; G06F 12/0817; G06F 12/0441; G06F 12/08; G06F 12/02
See application file for complete search history.

(56) References Cited

U.S. PATENT DOCUMENTS 5,809,536 A    9/1998    Young et al.
5,860,120 A    1/1999    Young et al.
(Continued)

FOREIGN PATENT DOCUMENTS

CN    101859281 A    10/2010
CN    102521163 A    6/2012
(Continued)

OTHER PUBLICATIONS

W. Shaogang, X. Weixia, P. Zhengbin, W. Dan, D. Yi and L. Pingjing, "Optimizing Private Memory Performance by Dynamically Deactivating Cache Coherence," 2012 IEEE 14th International Conference on High Performance Computing and Communication & 2012 IEEE 9th International Conference on Embedded Software and Systems.*

(Continued)

*Primary Examiner* — Pierre Michel Bataille
(74) *Attorney, Agent, or Firm* — Trop, Pruner & Hu, P.C.

(57) ABSTRACT

Example implementations relate to cache coherency protocols as applied to a memory block range. Exclusive ownership of a range of blocks of memory in a default shared state may be tracked by a directory. The directory may be associated with a first processor of a set of processors. When a request is received from a second processor of the set of processors to read one or more blocks of memory absent from the directory, one or more blocks may be transmitted in the default shared state to the second processor. The blocks absent from the directory may not be tracked in the directory.

20 Claims, 7 Drawing Sheets

(51) Int. Cl.
*G06F 12/0817* (2016.01)
*G06F 12/084* (2016.01)
*G06F 12/14* (2006.01)

(56) References Cited

U.S. PATENT DOCUMENTS

| | | | |
|---|---|---|---|
| 6,574,710 | B1 | 6/2003 | Gaither et al. |
| 6,973,543 | B1 | 12/2005 | Hughes |
| 9,311,238 | B2* | 4/2016 | Shum ................ G06F 12/0833 |
| 2003/0084253 | A1 | 5/2003 | Johnson et al. |
| 2003/0110360 | A1 | 6/2003 | Nakajima |
| 2007/0079074 | A1 | 4/2007 | Collier et al. |
| 2007/0255906 | A1* | 11/2007 | Handgen ............ G06F 12/0817 |
| | | | 711/E12.027 |
| 2009/0210628 | A1 | 8/2009 | Gaither |
| 2013/0151785 | A1 | 6/2013 | Yao et al. |
| 2014/0040552 | A1 | 2/2014 | Rychlik et al. |
| 2017/0199819 | A1 | 7/2017 | Huang et al. |
| 2019/0018786 | A1 | 1/2019 | Beard et al. |
| 2019/0188137 | A1 | 6/2019 | Kalyanasundharam et al. |
| 2020/0302766 | A1 | 9/2020 | Ellers et al. |
| 2020/0349075 | A1 | 11/2020 | Mcgee et al. |
| 2020/0349076 | A1 | 11/2020 | Dropps et al. |
| 2020/0349077 | A1* | 11/2020 | Dropps ............... G06F 12/0822 |

FOREIGN PATENT DOCUMENTS

| | | | |
|---|---|---|---|
| CN | 107003932 A | 8/2017 | |
| CN | 111684425 A | 9/2020 | |
| CN | 111858398 A | 10/2020 | |
| CN | 112579480 A | 3/2021 | |
| EP | 0847011 A2 | 6/1998 | |
| WO | WO-2018052671 A1 * | 3/2018 | ......... G06F 12/0804 |
| WO | 2019/012291 A1 | 1/2019 | |

OTHER PUBLICATIONS

Pradeep K. Sinha, "Distributed Shared Memory," in Distributed Operating Systems: Concepts and Design , IEEE, 1997, pp. 231-281.*

A. Ros, M. E. Acacio and J. M. Garcia, "A Direct Coherence Protocol for Many-Core Chip Multiprocessors, " in IEEE Transactions on Parallel and Distributed Systems, vol. 21, No. 12, pp. 1779-1792, Dec. 2010.*

Blas, C, et al, Increasing the Effectiveness of Directory Caches by Deactivating Coherence for Private Memory Blocks. ISCA, Jun. 4-8, 2011, 12 Pgs.

Caheny. P, et al, "Runtime-Assisted Cache Coherence Deactivation in Task Parallel Programs," Nov. 19, 2018, 12 Pgs.

Cuesta 8 et al, "Increasing the Effectiveness of Directory Caches by Avoiding the Tracking of Non-Coherent Memory Blocks," 2013, vol. 62, No. 3, 15 Pgs.

* cited by examiner

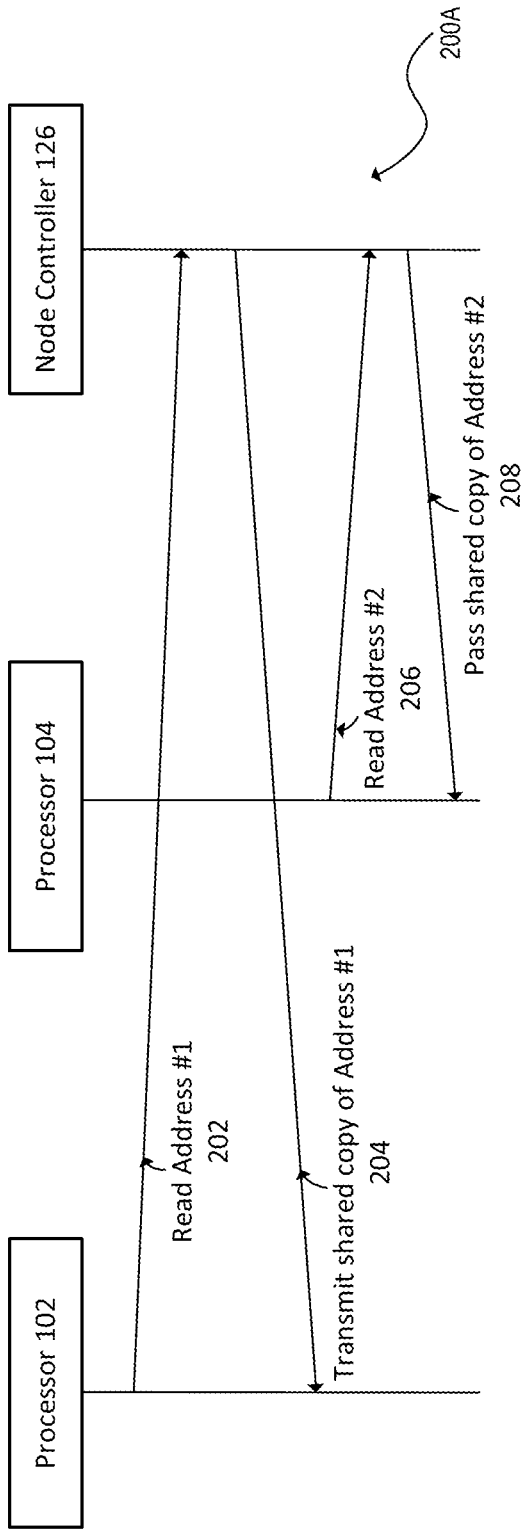
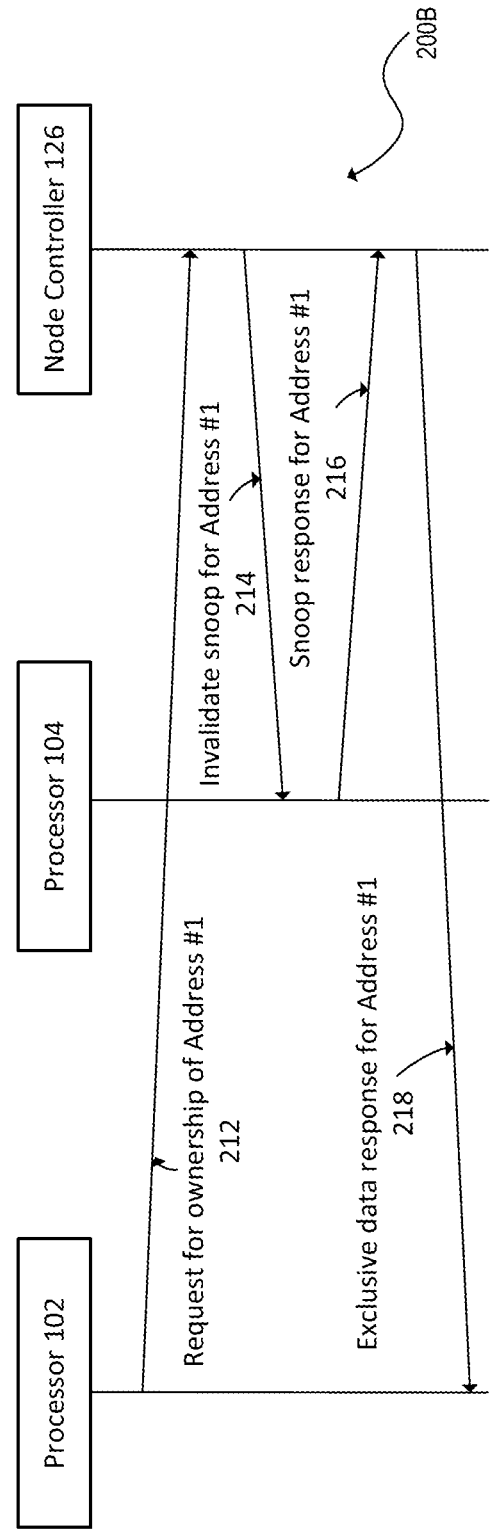

APPLICATION OF A DEFAULT SHARED STATE CACHE COHERENCY PROTOCOL

CROSS-REFERENCE TO RELATED APPLICATIONS

This application is a continuation application of and claims priority to application Ser. No. 17/230,286, filed on Apr. 14, 2021, the contents of which are hereby incorporated by reference in their entireties.

BACKGROUND

In a multiprocessor shared memory system, data can be shared among and accessed by multiple processors. Cache coherency is employed by multiple processors. Cache coherency is employed to ensure that changes to shared data or to copies of shared data are propagated throughout the system, such that each processor has access to uniform or coherent data. To this end, multiprocessor shared memory systems enforce cache coherency using hardware or software based protocols and mechanisms to arbitrate access to shared memory and enable processors to read and/or write to same data.

BRIEF DESCRIPTION OF THE DRAWINGS

Certain examples are described in the following detailed description and in reference to the drawings, in which:

FIG. 2a is a sequence diagram illustrating an example cache coherency protocol.

FIG. 2b is a sequence diagram further illustrating an example cache coherency protocol.

DETAILED DESCRIPTION OF SPECIFIC EXAMPLES

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

The present disclosure provides for the efficient management and enforcement of cache coherency using partial directory protocols to ensure that processors sharing memory can have access to uniform or coherent data. Cache coherency can be enforced using hardware or software based mechanisms and protocols. For example, hardware based approaches employ hardware components to enforce cache coherency in multiprocessor shared memory systems. As known to those of skill in the art, these approaches can include directory or snoop based protocols.

Directory-based protocols employ, among other things, coherency directories to track state and ownership information, e.g., whether a shared memory block is being shared with processors and, if so, with which processors, of memory blocks in the shared memory. When requests are made to process coherent operations such as reads or writes on memory blocks of the shared memory, the state and ownership information of the directories is used to coherently process the request. This can include managing various communications among processors and other computing components, for example, to share state and ownership information and effectuate an operation. Snoop based protocols enforce cache coherency by broadcasting messages to processors sharing the memory, indicating when coherent operations on the shared memory are requested or processed. These messages can cause the processors, for example, to update or invalidate their copies of shared data from the shared memory. In this way, the processors can avoid working on copies of data that are not coherent.

Figure 1:
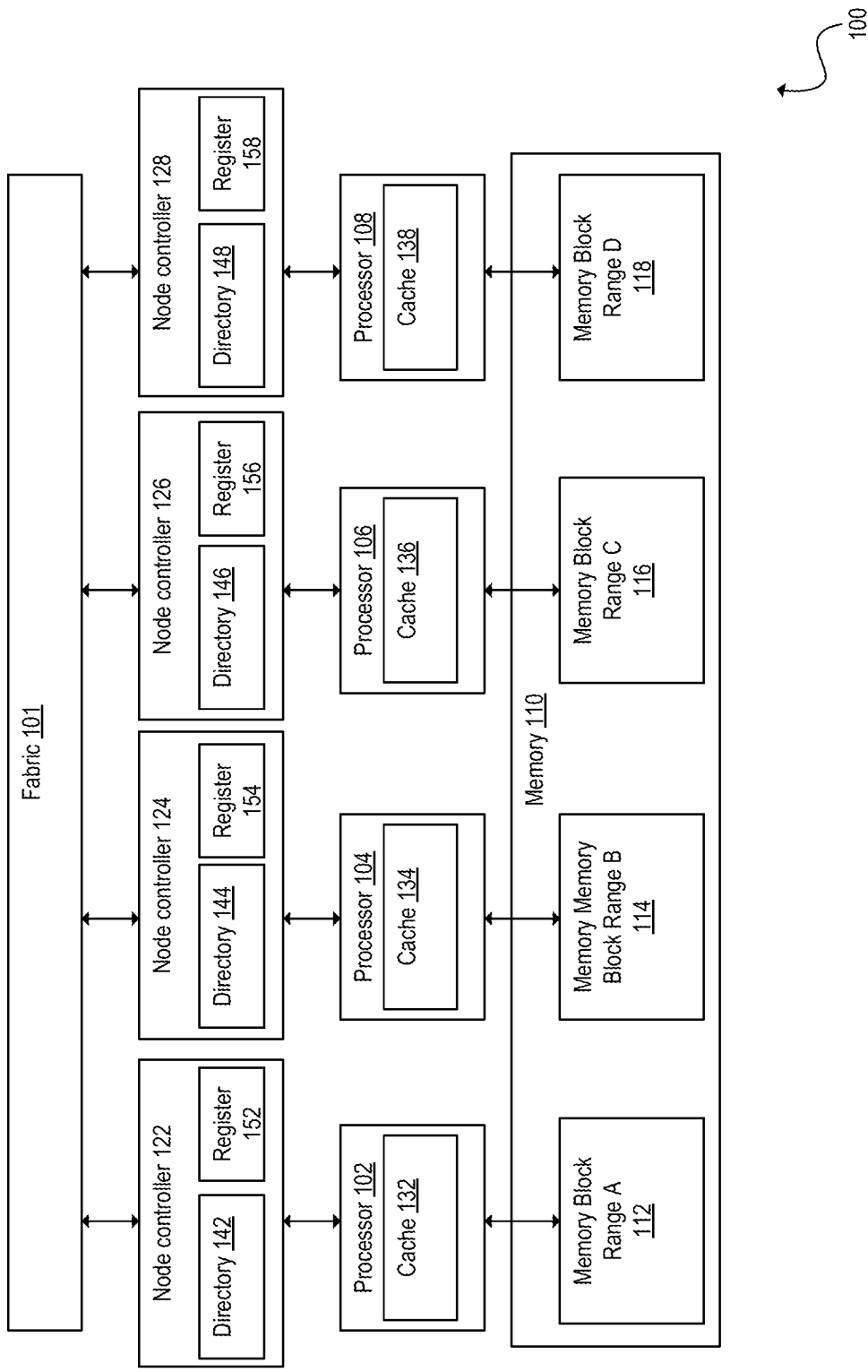
FIG. 1 is an example block diagram of a cache coherent computing system formed of various interconnected computing components.

FIG. 1 illustrates an exemplary embodiment of a cache coherent computing system 100 formed of various interconnected computing components. In some embodiments, system 100 is a multiprocessor system that includes a shared memory 110 accessible by some or all of the processors 102-108. As described in further detail below, each processor 102-108 may be associated with a respective range of memory blocks (also referred to herein as a memory block region), 112-118, collectively referred to herein as "memory 110." Each processor may further correspond to a node controller, 122-128 respectively. Each node controller 122-128 may be associated with a respective memory block range A-D, 112-118 respectively, such that a directory of a node controller may track a subset of blocks of a memory block range to which the node controller is associated. In this example, for purposes of clarity and conciseness, each node controller is associated with a single respective memory block range and a single processor. However, in other examples a node controller may be associated with multiple memory block ranges and/or multiple processors.

Each of the processors 102-108 can be or refer to one or more processing resources, nodes or units configured to execute instructions. For example, each of the processors 102-108 can be or refer to one or more central processing units (CPUs), a dual-core or a multi-core processor or processor socket that includes two or more CPUs, a single core of a processor, a computing cluster, a cloud server, or the like. In some embodiments, two or more of the processors 102-108, e.g., processor 102 and processor 104, can be communicatively coupled using point-to-point interconnects or busses.

Moreover, each of the processors 102-108 can include or be associated with one or more processor caches 132-138 for storing copies of data stored in a shared system memory, thereby making that data more quickly accessible by the processors. It should be understood that, in some embodiments, multiple processors or cores can share a single cache. It should also be understood that each cache can be physically disposed on the same or a separate chip or component as its corresponding processor. Because data can be accessed more quickly by a processor from its cache than from system memory, the caches 132-138 can be used to store copies of data stored in system memory that, for example, are accessed or are more likely to be accessed frequently or imminently, and/or may be accessed with more efficiency by a processor.

As shown in FIG. 1, the processors 102-108 are communicatively coupled to memory block ranges A-D, 112-118 respectively. In some examples, memory block ranges 112-118 form a shared system memory that can be accessed by all or some of the processors 102-108. It should be understood that, while each of the processors 102-108 can, in some embodiments, be communicatively coupled to and/or access data in one or more of the memory block ranges 112-118, each of the processors 102-108 can be directly associated with a respective one of the memory block ranges 112-118. Such correspondence or association between each of the processors 102-108 and one of the memory block ranges 112-118 can be caused by or result from a direct attachment or connection therebetween. For example, the processor 102 can be directly attached to the memory block range 112a, as illustrated in FIG. 1. In some embodiments, a memory block range (e.g., memory block range 112a) can be deemed to be "local" to its corresponding (e.g., directly connected) processor (e.g., processor 102), and can be referred to as "local memory" relative to its corresponding processor. On the other hand, a memory block range (e.g., memory block range 112a) can be deemed to be "remote" and can be referred to as "remote memory" relative to other processors (e.g., processor 104) beyond its local processor.

The processors 102-108 (and/or memory controllers of the processors 102-108) can be communicatively coupled (e.g., directly connected) to their respective memory block range 112-118 via one or more memory channels and/or buses such as a Peripheral Component Interconnect (PCI) bus, an Industry Standard Architecture (ISA) bus, a PCI Express (PCIe) bus, and high performance links, such as the Intel® direct media interface (DMI) system, QuickPath Interconnects, Hyper-Transport, Double Data Rate (DDR), SATA, SCSI, or Fibre Channel Bus, and the like.

Each of the memory block ranges 112-118 can include or be made up of any number of memory devices, which can be or include volatile (e.g., Random Access Memory (RAM), Static RAM (RAM) (SRAM), Dynamic RAM (DRAM)) and/or non-volatile (e.g., Non-Volatile RAM (NVRAM), Double Data Rate 4 Synchronous Dynamic (RAM) DDR4 SDRAM) memory devices. Other types of memory devices that may be used include read-only memory (ROM) (e.g., mask ROM, programmable ROM (PROM), erasable programmable ROM (EPROM), and electrically erasable programmable ROM (EEPROM)), flash memory, memristor devices, and the like.

Moreover, each of the memory block ranges 112-118 can be used to store software such as operating systems (OSs), hypervisors and other applications. The software stored on memory 110 is made up of processes and/or threads that can be executed concurrently and share resources such as memory (e.g., memory 110) and processors (e.g., processors 102-108). The processes and/or thread, when executed, can cause requests and responses to be transmitted among the processors 102-108 (and/or the node controllers 122-128). As described in further detail below, in some embodiments, the software stored in memory 110 can be used to provide cache coherency (e.g., in software-managed cache coherency implementations).

As mentioned above, memory block ranges 112-118 can form a shared system memory 110. Some or all of the processors 102-108 can access data stored in the system memory 110. For example, data stored in a range of memory blocks, e.g. memory block range 112, that is shared and thus a part of the system memory 110 can be accessed by a processor other than a processor local to memory block range 112, e.g. processor 104. It should be understood that permissions can be used to control access to all or portions of the system memory 110 and/or by all or some of the processors 102-108. It should be understood that, for purposes of simplicity, unless indicated otherwise, reference herein to any or all of the memories 110 shall refer to the portions that are shared and that make up the system memory 110, although the memory block ranges 112-118 can, in some embodiments, include non-shared regions that are only accessible by their respective local processors.

In some embodiments, accesses to and/or management of (e.g., cache coherency) memory 110 can be provided or handled by node controllers 112-128. In this regard, it should be understood that the processors (e.g., processor 102-108) and their corresponding memory block ranges (e.g., memory block ranges 112-118) are deemed to be local to the node controller with which they are associated (e.g., directly connected to, or most closely connected to). The node controllers 122-128 are therefore configured to provide and/or execute various functions on behalf of, for, or associated with their local or respective computing resources (e.g., memories, processors). Such functions can include or relate to cache coherency, routing, load balancing, fault resilience and the like. In some embodiments, some or all of the functionality of each of the node controllers 122-128 described herein can be implemented in one or more of processors 102-108.

The node controllers 122-128 (also referred to as "hubs" or "interconnect agents") are computing devices or components, which can be or include a general purpose processor (e.g., microprocessor, conventional processor, controller, microcontroller, state machine, sequencer), a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein, among others. It should be understood that the computing system 100 can include any number of node controllers. As described in further detail below, the node controllers 122-128 can provide, participate in or otherwise facilitate cache coherency (e.g., enforce cache coherency protocols) using hardware- and software-based approaches.

Although not illustrated in FIG. 1, each of the node controllers 122-128 can include one or more memories or memory devices, such as ROM, RAM, EEPROM, flash memory, registers or any other form of storage medium or element known to those of skill in the art. In some embodiments, cache coherency can be directory-based, such that the memory or storage of the node controllers 122-128 can be used to store information such as state and ownership relating to memory blocks in their local memories. It should be understood, however, that as described herein, state and ownership information can additionally or alternatively be stored in memory 110.

As illustrated in exemplary FIG. 1, each node controller 122-128 is communicatively coupled to and/or associated with a processor 102-108, respectively, and a memory block range 112-118, respectively. It should be understood that each of the node controllers 122-128 can be communicatively coupled to and/or associated with any number of local processors and/or memories. In some embodiments, the node controllers 122-128 are communicatively coupled and/or connected to their respective, local processors via interconnects such as UPI links.

Each of the node controllers 122-128 can be configured to provide cache coherency, such that changes to data stored in shared memory can be propagated throughout the system 100, to ensure that processors 102-108 have access to uniform versions of that shared data. The node controllers 122-128 can provide cache coherency by implementing directory- or snoop-based cache coherency schemes or protocols. In this regard, in some embodiments, each of the node controllers 122-128 can include a snoop or request accelerator and/or a coherency controller, which are configured to store information for and perform cache coherency functions. The node controllers (and/or their request accelerators and coherency controllers) can be or include computer hardware (e.g., sequencer, state machine) such as a circuit that includes logic and memory devices or storage elements. The logic is configured to execute or perform one or more of the functions, processes and/or methods described herein, including those for providing or managing cache coherency. The memory devices or storage elements can include caches and may be used to store directories.

To provide directory-based cache coherency, the node controllers 122-128 employ coherency directories 142-148 to track and/or store the state and ownership of all or subsets of memory blocks in their local memories. Although coherency directories 142-148 are illustrated as stored in the node controllers 122-128 for purposes of clarity and conciseness, coherency directories may be stored within other components of system 100, e.g. at memory blocks 112-118, or remotely e.g. to be accessed over a network. By storing directories in the node controllers 122-128, the node controllers can in some instances efficiently access state and ownership information without retrieving that information from directories in the range of memory blocks 112-118. In some embodiments, the node controllers 122-128 can include coherency directory caches, which can be used to store copies of coherency directory entries from the directories in the range of memory blocks 112-118. As with storing coherency directories in the node controllers 122-128, the use of coherency directory caches allows the node controllers 122-128 to more efficiently access state and ownership information.

To provide snoop-based cache coherency, the node controllers 122-128 can process snoop messages. As known to those of skill in the art, snoop messages can be broadcast to node controllers having copies of a memory block for which a request to read or write thereto has been made. In some embodiments, the node controllers 122-128 can store information or counters of the number of memory blocks within a memory region that are shared (e.g., active) or not shared (e.g., invalid) with processors or processor caches. Such information can be used to determine whether snoop requests need to be broadcast to other node controllers or processors, in cases in which a memory block to be accessed is shared.

As described above, a directory may track ownership of blocks of a memory block range to ensure cache coherency. In some instances, a directory may track which processor has exclusive ownership over a block of memory, and/or may track shared ownership of a block of memory, i.e. a block of memory that is not exclusively owned by any single processor or otherwise cached in the system. A processor may be said to have exclusive ownership over a block of memory where the processor has the exclusive ability to read and write to the owned block of memory. In some example implementations, only one processor may have exclusive ownership over a block of memory in the system at a given time.

A processor may be said to have shared ownership over a block of memory where the processor has the non-exclusive ability to read the block of memory. The processor may, according to a cache-coherency protocol, cache a copy of the shared memory block in a cache associated with or otherwise local to the processor. In some example implementations, any number of processors 102-108 may have a cached shared copy of the memory block at the same time.

In some example systems, a directory may track only a subset of the total cache coherent memory space of the memory. A directory that tracks only a subset of the total cache coherent memory space may be referred to herein as a "partial directory." In a system implementing a partial directory, a protocol may be implemented for the handling of memory blocks not tracked by the partial directory. An example protocol, referred to herein as a default invalid state protocol, may include the partial directory invalidating and/or flushing a block of memory from every processor cache upon the directory dropping the memory block, i.e. the directory no longer tracking the memory block.

As an illustrative example of a default invalid state protocol, processor 102 may request shared ownership of a first block of memory, e.g. a read request of a memory block from memory block Range B 114. A partial directory of node controller 124, e.g. directory 144, may determine that the requested first block of memory is not in the cache of the partial directory, or otherwise is not being tracked by the partial directory, whereby the partial directory may add the first block of memory to its cache (not shown). The partial directory may further track the requested first block of memory as in a shared state with processor 102 having a copy.

Processor 106 may request shared ownership of a second block of memory from memory block range B 114 different from the first block of memory. The partial directory may determine that the requested second block of memory is not in the cache of the partial directory, or otherwise is not being tracked by the partial directory, whereby the partial directory may add the second block of memory to its cache. However, the partial directory may determine that there is not enough room in the partial directory to track both the first and second block of memory, and may therefore evict the first block of memory to make room. The partial directory may further snoop to invalidate the first block of memory from the cache of processor 102.

Accordingly, a default invalid state protocol comes with some compromises. The partial directory may drop blocks of memory and invalidate the blocks of memory from processor caches that currently have a copy of the memory, and that may still be using the block of memory. Thus, in order for processor 102 to reclaim the block of memory, processor 102 may once again request access to the block of memory. This may add latency and increase traffic in the network resulting in a lower system performance relative to proposed alternative protocols discussed herein.

Another example protocol to be implemented with a partial directory, as will further be described below and as referred to herein as a default shared state protocol, may include the partial directory treating memory blocks not currently being tracked by the directory as in a shared state. In other words, a processor requesting to read a block of memory not tracked by the directory will receive a shared copy of the data. The directory may not track the block of memory despite being cached by the requesting processor where the processor merely maintains shared, and not exclusive ownership. A node controller said to be in a default invalid state may implement "a default invalid protocol,"

also referred to herein as a "default invalid state protocol." Similarly, a node controller said to be in a default shared state may implement a "default shared protocol," also referred to herein as a "default shared state protocol." In an example implementation, registers 152-158 may be implemented at node controllers 122-128 respectively, to indicate the state of the node controller. Specifically, registers 152-158 may dictate the protocol a respective node controller 122-128 is to apply to a particular memory region, also referred to herein as a memory block range, e.g. memory block ranges 112-118.

The node controllers 122-128 can be communicatively coupled to and/or interconnected with one another via the fabric 101 (or "fabric interconnect") and, the processors 102-108 can communicate with one another therethrough. The fabric 101 can include one or more direct and/or switched interconnects. For example, in some embodiments, the fabric 101 can include direct interconnections between the node controllers 122-128 (e.g., to minimize latency). Accordingly, the fabric 101 can be used to transmit data and/or messages between or among one or more of the node controllers 122-128 and/or processors 102-108. Such communications can include, for example, memory access requests (e.g., to read or write from or to memory or cache blocks), state change requests (e.g., invalidate), acknowledgments, and other messages known to those of skill in the art and as needed for the applicable cache coherency protocols.

It should be understood that the components (e.g., node controllers 122-128, processors 102-108, and memory 110) of the system 100 can be physically housed together or separately. For instance, the exemplary components of the system 100 illustrated in FIG. 1 can be provided in a single chassis or in multiple chasses. As described above, the system 100 can include any number of node controllers, processors, and/or memories beyond those illustrated in FIG. 1, which can be housed together or separately. Moreover, in some embodiments, the system 100 can include additional systems or sub-systems that are formed of node controllers, processors and/or memories, and are communicatively coupled to the fabric 101, through which communications with the node controllers 122-128 and processors 102-108 can be achieved.

FIGS. 2A and 2B are sequence diagrams, 200A and 200B receptively, illustrating example cache coherency protocols. Specifically, sequence diagram 200A and sequence diagram 200B illustrate example implementations of a default shared state protocol. Although execution of the sequences, 200A and 200B respectively, are described below with reference to system 100 of FIG. 1, this is for explanatory purposes and other suitable components for execution may be utilized. For purposes of illustration, processor 102, processor 104, and node controller 126 of FIGS. 2A and 2B may be processor 102, processor 104, and node controller 126 of FIG. 1. In some examples, steps of sequences 200A and 200B may be executed substantially concurrently or in a different order than shown in FIGS. 2A and 2B. In some examples, sequences 200A and 200B may include more or less steps than are shown in FIGS. 2A and 2B, and in some examples some of the steps may be ongoing and/or may repeat.

Turning to FIG. 2A, a processor, e.g. processor 102, may request to read an address of memory 110, or more specifically, a number of memory blocks within memory at a particular address. In some examples, processor 102 may first check its local cache, in this case cache 132, for the requested address. If the address is not present in the local cache, i.e. cache 132, processor 102 may transmit a read request 202 to a node controller associated with the memory block range at which the address is located—in this example node controller 126.

Node controller 126, upon receiving the read request, may check in its local directory, i.e. directory 146, to determine whether directory 146 is tracking the memory blocks associated with the address. If it is determined that the address is not being tracked by the directory, e.g. the directory address is not in a cache of directory 146, node controller 126 may assume—in the default shared state—that the requested address is shared. Thus, directory 146 is not updated to track the requested address, as would be the case in a default invalid state protocol. Instead, the memory block is transmitted 204 in a shared state to the requesting processor 102.

A different processor, e.g. processor 104, may request to read a different address of memory 110. Processor 104 may first check its local cache, in this case cache 134, for the requested address. If the address is not present in the local cache, i.e. cache 134, processor 104 may transmit a read request 206 to node controller 126 to access the different address.

Node controller 126, upon receiving the read request, may check in its local directory, i.e. directory 146, to determine whether directory 146 is tracking the memory blocks associated with the different address. If it is determined that the different address is not being tracked by the directory, e.g. the directory address is not in a cache of directory 146, node controller 126 may assume that the requested address is shared. Thus, directory 146 is not updated to track the requested different address, as would be the case in a default invalid state protocol. Instead, the memory block is transmitted 208 in a shared state to the requesting processor 104. By not tracking these read requested addresses in example partial directory 146, directory 146 does not run out of space, as may be the case in a default invalid state protocol. Thus, directory 146 in a default shared state protocol may not evict as many blocks of memory to create space for additional addresses for tracking as would directory 146 in a default invalid state protocol, nor may directory 146 invalidate blocks of memory from the caches of processors as frequently as would directory 146 if in a default invalid state protocol. Since the directory is not burdened with tracking shared ownership in a default shared state protocol, the directory may have more space for tracking addresses of exclusive ownership.

Turning to FIG. 2B, a processor, e.g. processor 102, may request exclusive ownership of an address of memory 110—e.g. processor 102 may request to write to the address. In some examples, processor 102 may first check cache 132 for the requested address. If the address is not present in cache 132, processor 102 may transmit a request for ownership of the address 212 to a node controller associated with the memory block range at which the address is located—in this example node controller 126.

Node controller 126, upon receiving the request for ownership, may check in its local directory, i.e. directory 146, to determine whether directory 146 is tracking the memory blocks associated with the address. If it is determined that the address is not being tracked by the directory, e.g. the directory address is not in a cache of directory 146, node controller 126 may assume—in the default shared state—that the requested address is shared.

However, because exclusive ownership is requested by processor 102, node controller 126, in this example instance, may invalidate the address at the cache of each processor sharing memory 110, e.g. caches 132-138 of processors 102-108. In this illustrated example, for purposes of clarity and conciseness, node controller 126 is shown, at 214, invalidating the address at processor 104. Because directory 146 is responding to a request for exclusive access to an address, directory 146 in this example instance may track the requested address.

Node controller 126 may receive a response from each processor, in this illustrated example processor 104, confirming that the address was invalidated 216. Upon receiving the confirmation, node controller 126 may transmit 218 exclusive ownership of the requested address to processor 102. While a default shared state protocol may be more efficient in response to read requests, a default invalid state protocol may, in the event of a request for exclusive ownership of an address, be more efficient than the default shared state protocol.

Accordingly, for applications that primarily read data, such as large memory databases that primarily search through memory, a default shared state protocol may be more efficient than a default invalid state protocol.

Figure 3:
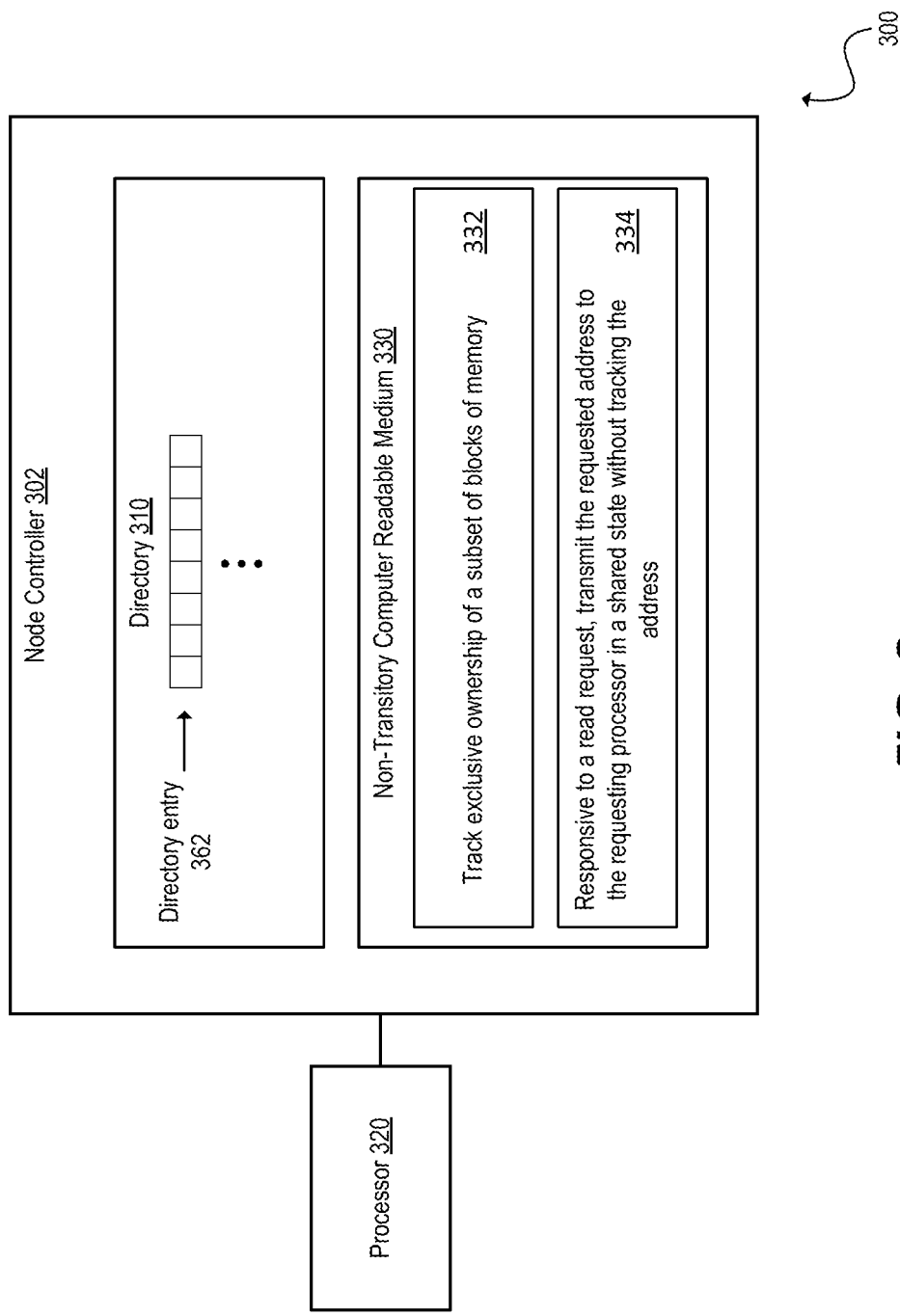
FIG. 3 is a block diagram illustrating an example node controller for enforcing one or more cache coherency protocols.

FIG. 3 is a block diagram 300 illustrating an example node controller 302 for enforcing one or more cache coherency protocols. Node controller 302 may be any number of computing devices or components, which can be or include a general purpose processor (e.g., microprocessor, conventional processor, controller, microcontroller, state machine, sequencer), a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein, among others. Node controller 302 may for example, be implemented in computing system 100, e.g. as any of node controllers 122-128.

Node controller 302 may include a directory 310, for tracking ownership of blocks of a memory block range of a shared memory to ensure cache coherency. In some instances, a directory may track which processor has exclusive ownership over a block of memory, and/or may track shared ownership of a block of memory, i.e. a block of memory that is not exclusively owned by any single processor or otherwise cached in the system. Directory 310, may for example, be any of directories 142-148 respectively, and may track a respective memory block range 112-118 of memory 110. Although directory 310 is illustrated as local to node controller 302, directory 310 may be part of or otherwise stored on the same or different hardware than node controller 302, and may be accessible by node controller 302 remotely, e.g. via a network.

Directory 310 may include any number of directory entries 362 for tracking exclusive, or in some instances shared, blocks of memory. Directory 310 may in some examples be a partial directory, in that directory 310 may track only a subset of a total cache coherent memory space, as determined by the protocol enforced by node controller 302. Specifically, node controller 302 may enforce protocols, e.g. a default invalid protocol, a default shared protocol, etc., that determine which blocks of memory directory 310 tracks.

Node controller 302 may further include non-transitory computer readable medium 330, that when executed by a processor, e.g. processor 302, may carry out a cache coherency protocol. Non-transitory computer readable medium 330 may be implemented in a single device as illustrated, or may be distributed across devices. Likewise, processor 320 may represent any number of physical processing resources that may be part of a same- or different hardware in communication over a network-capable of executing instructions stored by computer readable medium 330. Processor 320 may be, for example, any combination of processors 102-108 illustrated in example system 100 of FIG. 1.

As used herein, a "computer readable medium" may be any electronic, magnetic, optical, or other physical storage apparatus to contain or store information such as executable instructions, data, and the like. For example, any computer readable medium described herein may be any of RAM, EEPROM, volatile memory, non-volatile memory, flash memory, a storage drive (e.g., an HDD, an SSD), any type of storage disc (e.g., a compact disc, a DVD, etc.), or the like, or a combination thereof. Further, any computer readable medium described herein may be non-transitory. In examples described herein, a computer readable medium or media may be part of an article (or article of manufacture). An article or article of manufacture may refer to any manufactured single component or multiple components.

Processor 320 may be a central processing unit (CPU), graphics processing unit (GPU), microprocessor, and/or other hardware device suitable for retrieval and execution of instructions stored in computer readable medium 330. Processor 320 may fetch, decode, and execute program instructions 332-334, and/or other instructions. As an alternative or in addition to retrieving and executing instructions, processor 320 may include at least one electronic circuit comprising a number of electronic components for performing the functionality of instructions 332-334, and/or other instructions.

Instructions 332-334 of non-transitory computer readable medium 330 may, in this example, enforce a default shared protocol when executed. In an example, a default shared protocol may cause directory 310 to track exclusive ownership of blocks of a shared memory, and may treat any blocks of memory not tracked by directory 310 as "shared memory."

Specifically, block 332 includes instructions for directory 310 to track exclusive ownership of a subset of blocks of memory. Thus, directory 310 may for example, track blocks of memory requested by a processor upon granting the requesting processor exclusive ownership over the requested blocks of memory, e.g. responsive to a write request by the processor.

Block 334 includes instructions for directory 310 to, responsive to a read request, transmit the requested memory block to the requesting processor. Specifically, to transmit the requested memory block in a shared state without tracking the address at directory 310. Thus, for example, a directory entry 362 will not be created at directory 310 responsive to, or in anticipation of, transmitting the requested memory block to the processor in the shared state. Accordingly, node controller 302 may enforce a default shared state protocol, such that directory 310 acts as a partial directory, tracking exclusive ownership of memory blocks and not tracking any memory blocks transmitted in a shared state to requesting processors.

Figure 4:
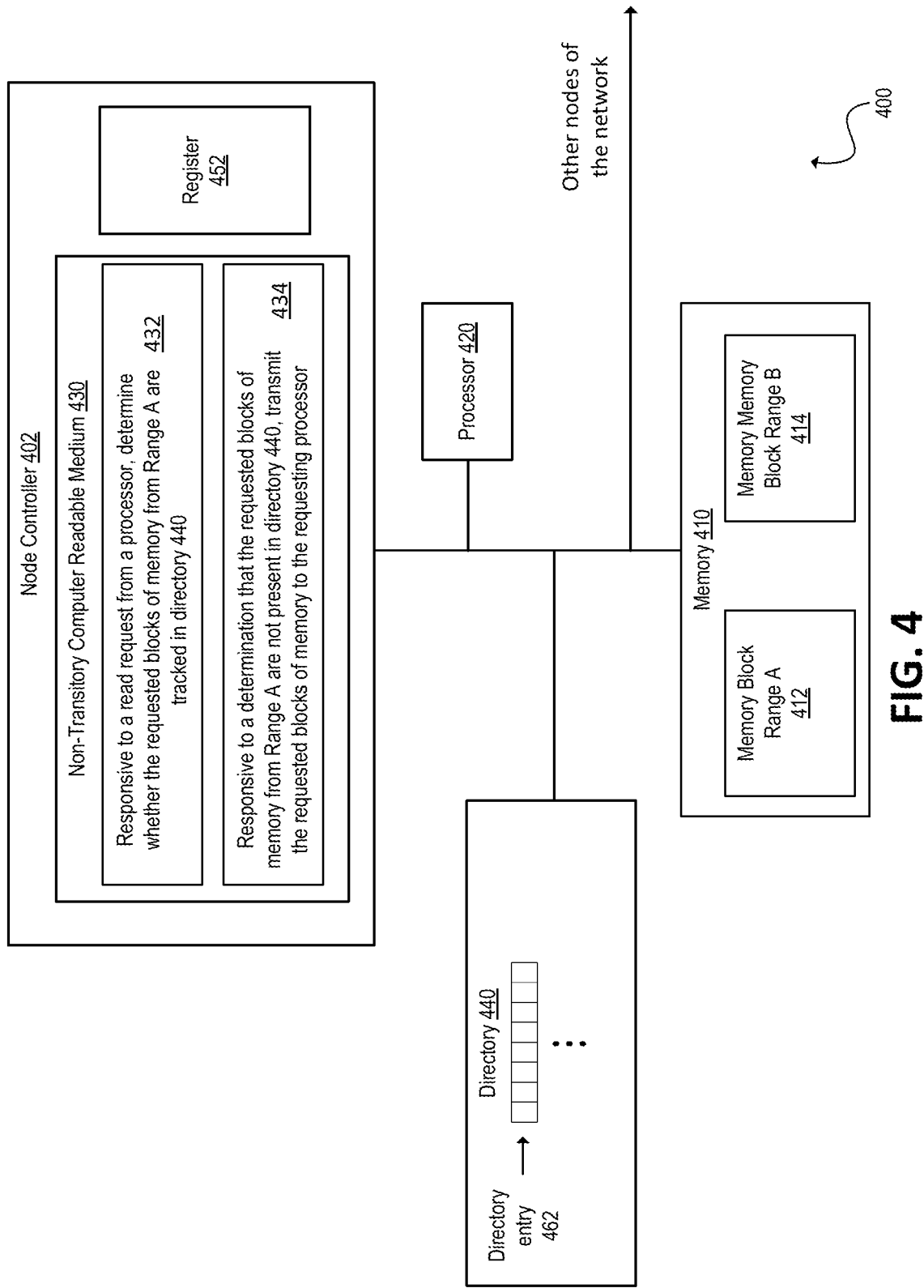
FIG. 4 is a block diagram illustrating an example system for enforcing one or more cache coherency protocols.

FIG. 4 is a block diagram illustrating an example system for enforcing one or more cache coherency protocols. System 402 may include a node controller 402, which, like node controller 302 of FIG. 3, may be any number of computing devices or components, which can be or include a general purpose processor (e.g., microprocessor, conventional processor, controller, microcontroller, state machine, sequencer), a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein, among others. Node controller 402 may for example, be implemented in computing system 100, e.g. as any of node controllers 122-128.

Node controller 402 may by in communication with a directory 440 over a network for tracking ownership of blocks of memory to ensure cache coherency. Node controller 402 may further be in communication with a shared memory 410, e.g. over a network. While node controller 402 is illustrated as having two memory block ranges (otherwise referred to as memory regions herein), 412 and 414 respectively, memory 410 may include any number of memory block ranges. In an example implementation, directory 440 may be associated with a particular memory block range of memory 410, e.g. memory block range A 412, such that directory 440 tracks at least a subset of memory blocks from the associated memory block range.

Memory 410 may be shared in that it may be accessible by other nodes of the network. In an example, other nodes of the network may include other node controllers, other directories, other processors, or any combination thereof. These other directories of the network may be associated with different memory block ranges of memory 410 than directory 440. Furthermore, in some examples, other node controllers than node controller 402 may implement different cache coherency protocols than node controller 402. In an example, other processors of the network may request exclusive or shared access to memory blocks of shared memory 410.

Node controller 402 may include a non-transitory computer readable medium 430 which may include similar architecture to non-transitory computer readable medium 330 of FIG. 3. Computer readable medium 430 may include instructions 432 and 434, which, when executed, may implement another example default shared state protocol for cache coherency. Instructions of computer readable medium 430 may be executed by processor 420, which may include similar architecture to that of processor 320 of FIG. 3 as described above.

In an example, memory block range A 412 of memory 410 may be tracked by directory 440 according to a default shared state protocol. In some examples, memory block range B 414 may be tracked by a same or different directory according to a different protocol, e.g. a default invalid state protocol. Responsive to receiving a read request from a processor to read any number of blocks of memory from memory block range A 412, instructions 432 when executed may determine whether the requested blocks of memory are tracked in directory 440.

It may be determined that the requested blocks of memory from Range A are not present, or are otherwise tracked, by directory 440. In this instance, instructions 434 when executed may cause directory 440 to transmit the requested block of memory to the requesting processor. In an example, the requested blocks of memory may be transmitted to the requesting processor without tracking the absent blocks in directory 440. Accordingly, memory blocks within memory block range A 412 of memory 410 may be tracked according to a default shared state protocol, which may in this example be a more efficient protocol than a default invalid state protocol for use of this particular memory range.

Applying different cache coherency protocols to different regions of memory enables the flexibility to apply a most efficient protocol in accordance with how a particular memory region is utilized. For example, for applications that primarily read data, like large in-memory databases utilized primarily for searching through memory, a default shared state protocol may be more efficient than a default invalid state protocol for the reasons described above. Conversely, an application that executes a high frequency of memory writes, a default invalid state protocol may be more efficient than a default invalid state protocol. Thus, different applications can be associated with different memory ranges of a common shared memory with different protocols associated with the different memory ranges.

In some examples, node controller 402 may include a register 452, which may track a state of one or more memory block ranges. In this example, node controller 402 may check the register 452 to determine which cache coherency protocol to execute. The register 452 may be local to node controller 402 as illustrated, or remote from node controller 402 and accessible by node controller 402 over a network. Register 452 may be hardware, or a combination of hardware and software. Register 452 may in some examples, be electronic circuitry including both base and limit registers, such that a series of base and limit registers may specify the address limits of each memory block range in memory 410. In an example, BIOS could supply variables that control which partial directory mode is enabled and how much memory is present in each memory block region, e.g. memory block range A 412 and memory block range B 414. The amount of memory per region may be controlled by the hardware's base and limit register settings. Each base and limit register may further include a directory mode register bit to determine which directory mode may be used to process the request.

In some examples, the protocol applied to a particular memory block range may be dynamic, such that a first protocol may be applied to a memory block range at a first time and a different protocol may be applied to the memory block range at a second time different from the first time. Put another way, a memory block range may be dynamic such that the protocol applied to the memory block range may change automatically, or as otherwise determined by various metrics as will be described further herein. Register 452 may, for example, flip states, i.e. direct node controller 402 to apply a different protocol to a particular memory block range to which the register is associated, responsive to a threshold. In some examples, any number of memory block ranges of memory 410 may be dynamic with respect to the protocol applied to them. In some examples, some memory block ranges of memory 410 are static, such that the protocol applied to them is fixed, and does not change dynamically.

With respect to dynamic memory block ranges, the protocol applied to a dynamic memory block range may be determined by any number of metrics. For example, protocol layer traffic of the network as generated by an application utilizing a particular memory block range may be analyzed. Furthermore, statistics may be gathered while running a particular cache coherency protocol with respect to a particular memory block range.

For example, a count of directory entries 462 in a cache of directory 440 may be recorded. If a threshold count of shared memory block entries persists in the cache, register 452 may change states from a default invalid state protocol to a default shared state protocol. Similarly, if a threshold count of exclusively owned memory block entries persists, register 452 may change states from a default shared state protocol to a default invalid state protocol. In another example, a ratio of shared memory blocks entries to exclusively owned memory block entries (or vice versa) at a cache of directory 440 may be tracked. Where a threshold ratio persists, register 452 may change states.

In another example, a number of directory evictions caused by shared read requests may be tracked. A threshold number of evictions over a predetermined period of time may indicate that directory 440 is being thrashed, and may trigger a register 452 flip to the default shared state protocol. In yet another example, a number of invalidate snoops, e.g. at 214 of FIG. 2B, may be tracked. A threshold number of snoops over a predetermined period of time may trigger a register 452 flip to the default invalid state protocol.

When memory 410 is partitioned and/or otherwise allocated, a virtual machine manager (VMM), may allocate a memory block region to an application as indicated or otherwise preferred by the application. In some examples, where there is not enough memory to allocate a preferred memory to an application, an operating system (OS) may allocate memory following a non-preferred protocol to the application. In some examples, the number of times non-preferred memory was allocated to an application over a predetermined period of time may be tracked. Where a threshold is reached, the protocols applied to dynamic memory block regions may be adjusted.

Accordingly, a number of metrics may be tracked to determine an appropriate protocol for a particular memory block region at a given time. Logic for switching between protocols may be utilized, and this logic may rely on the metrics described above. Register 452 may, for example, include programmable threshold settings and performance counters to track any number of metrics. In an example, software may be utilized for programming the threshold settings, and may dictate to the hardware when to flip register 452.

Figure 5:
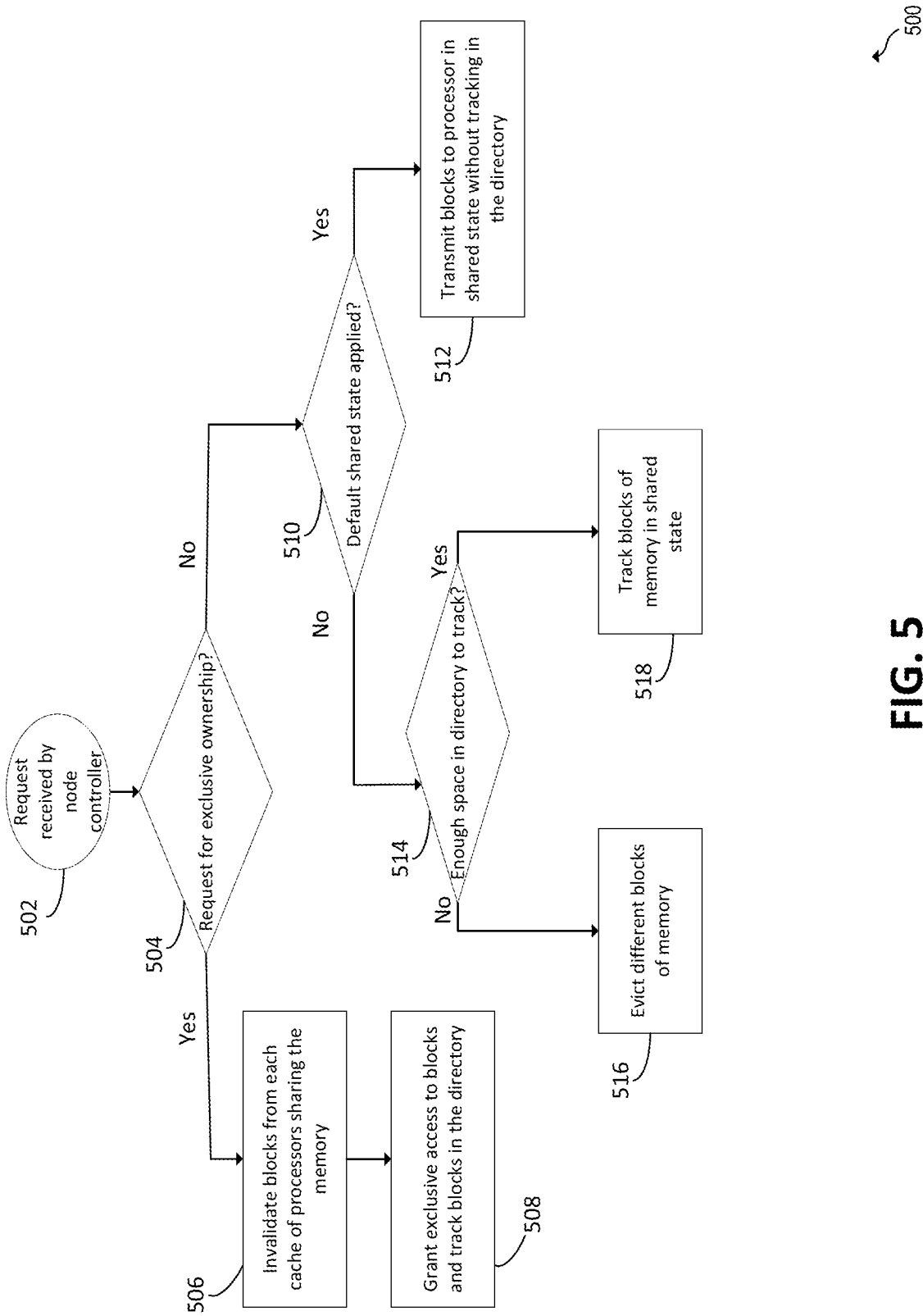
FIG. 5 is a flowchart illustrating a method for implementing multiple cache coherency protocols.
Figure 6:
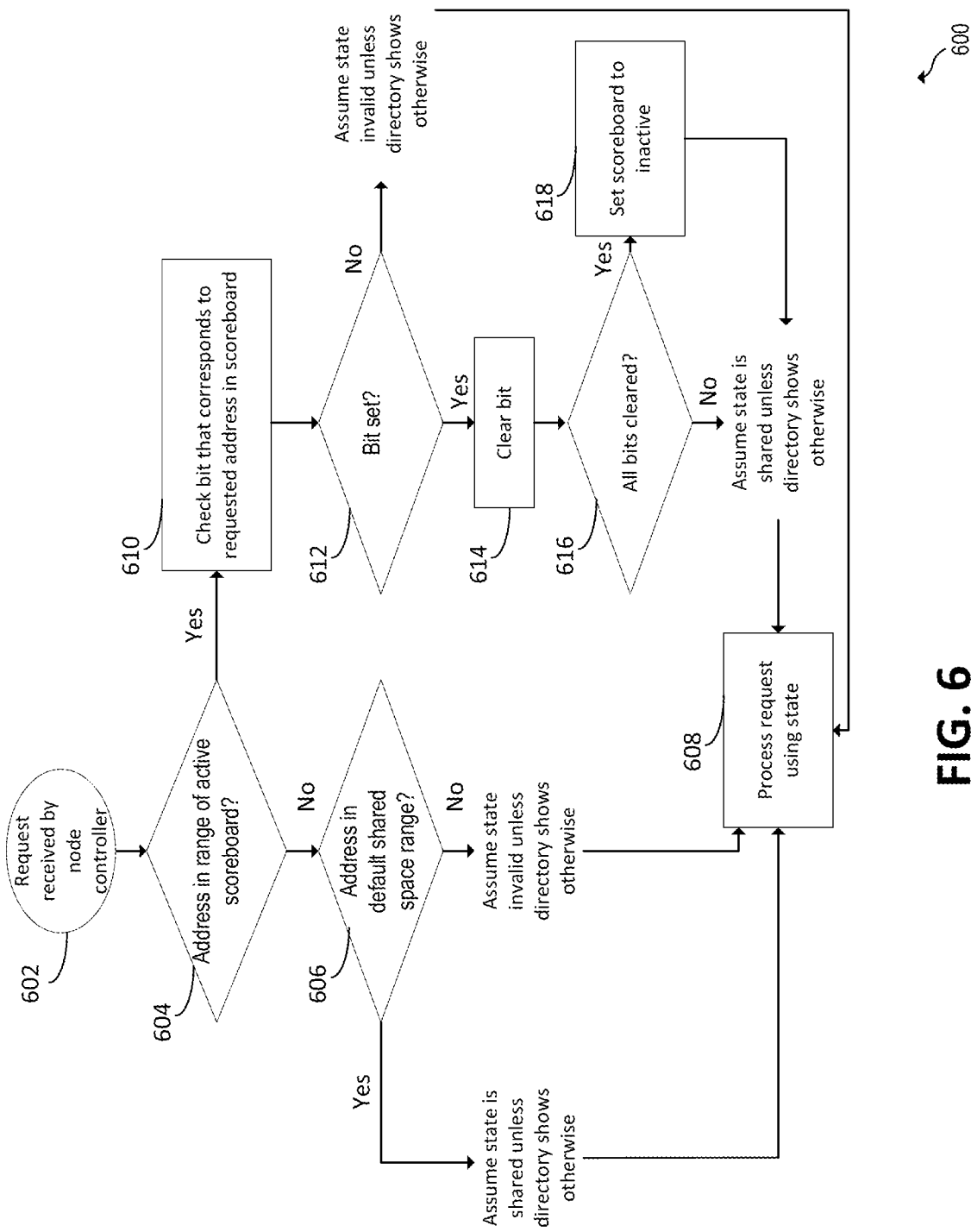
FIG. 6 is a flowchart illustrating a method for switching a memory region from a default shared state protocol to a default invalid state protocol.

FIG. 5 is a flowchart 500 illustrating a method for implementing multiple cache coherency protocols. FIG. 6 is a flowchart 600 illustrating a method for switching a memory region from a default shared state protocol to a default invalid state protocol. Although execution of method 500 and method 600 are described below with reference to system 100 of FIG. 1 or system 400 of FIG. 4, this is for explanatory purposes and other suitable components for execution of method 500 and method 600 may be utilized. Method 500 and method 600 may be implemented in the form of executable instructions stored on a machine-readable storage medium and/or in the form of electronic circuitry, e.g. hardware. In some examples, steps of method 500 and method 600 may be executed substantially concurrently or in a different order than shown in FIG. 5 and FIG. 6. In some examples, methods 500 and 600 may include more or less steps than are shown in FIG. 5 and FIG. 6. In some examples, some of the steps of method 500 and method 600 may, at certain times, be ongoing and/or may repeat.

At block 502, a request to any number of memory blocks may be received by a node controller, e.g. node controller 402 of FIG. 4. The request may be received by a processor, e.g. any of processors 102-108 of FIG. 1. At block 504, it may be determined whether the request is for exclusive ownership over the memory blocks, or for shared access to the memory blocks, e.g. a read request.

A determination that the request is for exclusive ownership may be followed by an invalidation of memory blocks at block 506, i.e. a snoop, from each cache of processors sharing access to the memory, e.g. memory 110 of FIG. 1 or memory 410 of FIG. 4. The snoop may be carried out by a directory, e.g. any of directories 142-148 of FIG. 1 associated with a memory block range having the requested memory blocks. At block 508, exclusive access to the requested memory blocks may be granted by the directory. The owned blocks may further be tracked by the directory.

A determination that the request is for shared access to the memory blocks may be followed by a determination as to which protocol is to be applied to the requested memory blocks. Specifically, at block 510 it may be determined whether a default shared state protocol is to be applied. As described above, the determination may be made by a node controller checking a respective registry for state information.

A positive determination may be followed by the node controller directing the associated directory to transmit the requested memory blocks to the requesting processor at block 512. As described above, this transmission may occur without tracking the transaction in the directory.

A determination at block 510 that a default shared state should not apply, or in other words, that a default invalid state protocol applies, is followed by a determination as to whether the directory corresponding to the requested memory blocks has enough space in its cache to track the transaction at block 514.

A positive determination at block 514 may result in the directory tracking the blocks of memory in a shared state at block 518. Conversely, the directory associated with the requested memory blocks may, at block 516, evict an older entry from its cache to make room to track the latest request. In an example implementation, for purposes of coherency, the directory may invalidate the memory blocks associated with the older entry from each other processor sharing the memory prior to the eviction.

As described above, some memory block regions may be dynamic such that the protocol applied to the memory block region may be changed according to various metrics. Specifically, a memory block region may be switched from a default invalid state protocol to a default shared state protocol. A memory block region may also switch from a default shared state protocol to a default invalid state protocol. In some examples, the mechanism described below may be implemented to maintain coherency during a switch from a default shared state protocol to a default invalid state protocol, since shared states are not tracked by the directory in a default shared state.

An example mechanism may include flushing each line associated with the transitioning memory region. If the memory region is large however, this may take a significant amount of time. Too much switching between protocols could result in over-flushing which would lead to a degradation in system performance.

Another example mechanism may include the implementation of a scoreboard. For instance, each address being tracked by the directory includes a corresponding bit at the scoreboard. At the time it is determined to switch a memory block region from a default shared state protocol to a default invalid state protocol, e.g. by meeting any of the thresholds indicated above, the scoreboard may be initialized. The scoreboard at initialization may indicate that each address in the memory block region to be switched is shared. As addressed are accessed, corresponding scoreboard bits may be de-asserted. When an address is accessed that corresponds to a de-asserted bit, the directory cache and/or register may be consulted for the directory state. Once all bits in the scoreboard are de-asserted, the scoreboard may be free for re-initialization. Thus, in some example implementations, the scoreboard may be utilized by multiple memory regions.

FIG. 6 is an illustrative example of how a scoreboard may be utilized for switching a dynamic memory region from a default shared state to a default invalid state. Specifically, a request for access to one or more memory blocks may be received by a node controller at block 602. It may be determined at block 604 whether the requested memory blocks have an address within the range of the scoreboard, i.e. within the dynamic memory region to be switched. A negative determination may be followed by a determination at block 606 as to whether the address falls within a memory block region having an applied default shared state protocol.

A positive determination at block 606 is followed by an assumption that a default shared state protocol is to be applied unless the relevant directory shows otherwise. A negative determination at block 606 is followed by an assumption that a default invalid state protocol is to be applied unless the relevant directory shows otherwise. The request is then processed at block 608 according to the assumed protocol.

A positive determination at block 604 is followed by the node controller checking the scoreboard bit corresponding to the address at block 610. A determination is made at block 612 as to whether the bit is set, i.e. asserted. If the bit is de-asserted, a default invalid state protocol is assumed unless the directory shows otherwise and the request is processed according to the assumed protocol at block 608. Conversely, if the bit is determined to be set at block 612, the bit is cleared at block 614.

It may then be determined at block 616 whether each bit of the score has been cleared, i.e. de-asserted. A positive determination at block 616 is followed by a setting of the scoreboard to inactive at block 618, as the memory block region has completed switching from a default shared state protocol to a default invalid state protocol. A negative determination at block 616 is followed by an assumption that the state is shared unless the directory shows otherwise. The request is then processed at block 608 according to the assumed protocol.

Figure 7:
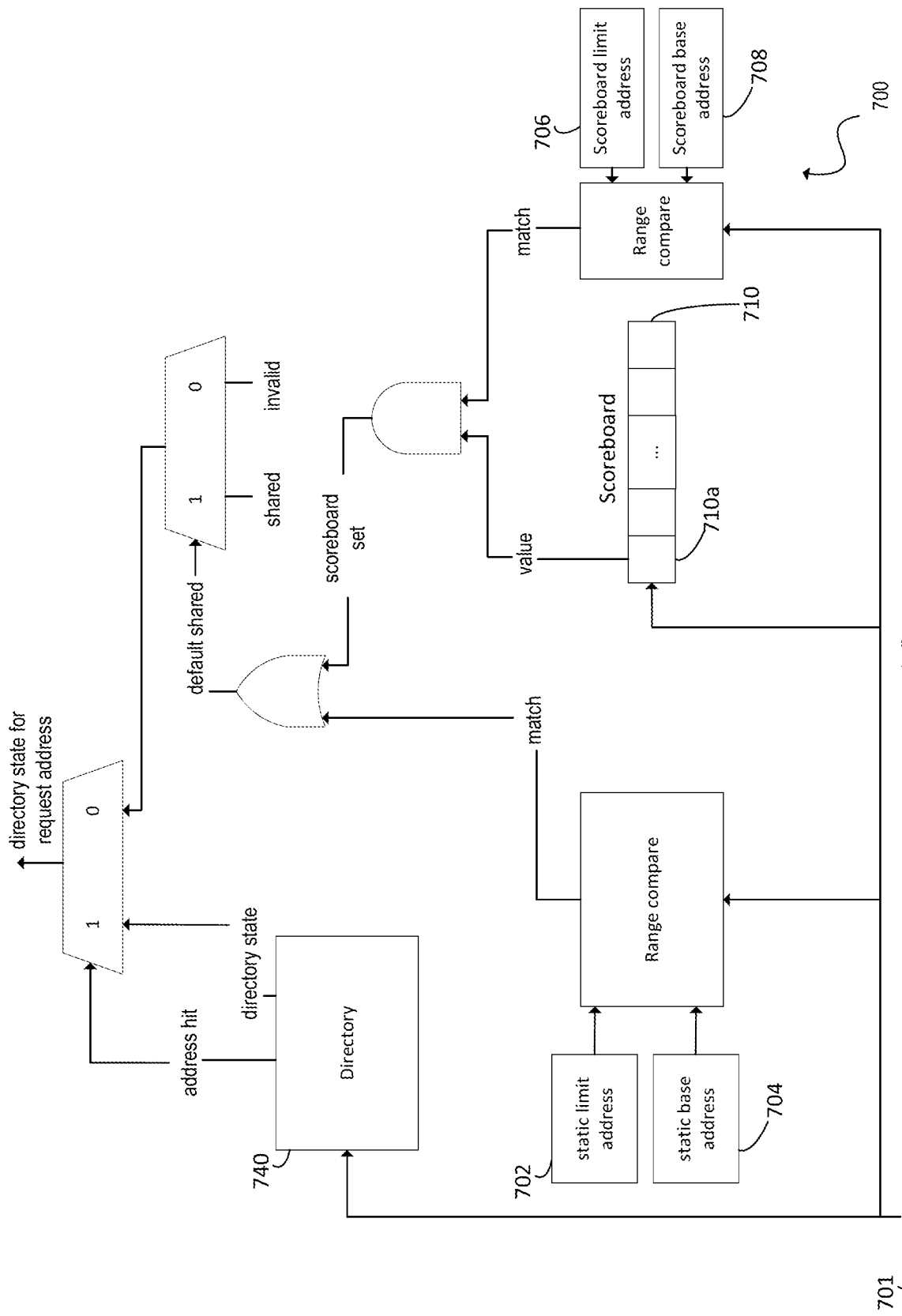
FIG. 7 is a circuit diagram illustrating use of a scoreboard for switching a protocol applied to a dynamic memory region from a default shared state protocol to a default inactive state protocol.

FIG. 7 is a circuit diagram 700 further illustrating use of a scoreboard for switching the protocol applied to a dynamic memory region from a default shared state protocol to a default inactive state protocol. The example circuitry may be utilized where a shared memory includes both a static default shared state protocol memory region and a dynamic default shared state memory region.

Circuit diagram 700 includes a first base and limit register pair, 702 and 704 respectively, that together define an upper and lower boundary of a static memory block region. Although one pair of base and limit registers 702 and 704 are illustrated in relation to the static region for purposes of clarity and conciseness, multiple base and limit register pairs may be utilized to define the boundaries of multiple static memory block regions.

Where an incoming address 701 is determined to be within the range of base 702 and limit 704 register, then the protocol applied to the requested address is determined by the default state of the static memory block region unless directory 740 indicates otherwise. For example, if the address is within a default shared state memory block range as determined by base 702 and limit 704 registers, then a default shared state protocol is applied unless directory 740 indicates otherwise. If directory 740 indicates otherwise, the protocol applied is dictated by the protocol indicated by directory 740.

Circuit diagram 700 further includes a second base and limit register pair, 706 and 708 respectively. The second base 706 and limit 708 register pair may together define an upper and lower boundary of a dynamic memory block region. Second base 706 and limit 708 register pair may be associated with a scoreboard 710. Although one pair of base and limit registers 706 and 708 with one scoreboard 710 is illustrated in relation to the dynamic region for purposes of clarity and conciseness, multiple base and limit register pairs and scoreboards may be utilized to define the boundaries of multiple dynamic memory block regions.

If an incoming address falls within the range of the base and limit registers and is not otherwise present in directory 740, the applied protocol may be determined by a bit 710a at scoreboard 710 corresponding to address 701. If bit 710a is set or otherwise asserted, then a default shared state protocol will be applied. Conversely, if bit 710a is cleared or otherwise de-asserted, then a default invalid state protocol will be applied.

When it is determined that an address falls within the region of scoreboard 710, as determined by base 706 and limit 708 register, the bit is cleared or otherwise de-asserted. Once each bit is clear, the scoreboard may become inactive as the dynamic memory block region has successfully changed from a default shared state region to a default invalid state region.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

The invention claimed is:

1. A method comprising:
tracking, by a node controller when in a default shared state using a directory associated with a first processor of a set of processors, exclusive ownership of a range of blocks of a memory; and
responsive to receiving a request from a second processor of the set of processors to read one or more blocks of the range of blocks:
determining, by the node controller when in the default shared state, that the one or more blocks of the range of blocks are absent from the directory, and
in response to determining that the one or more blocks of the range of blocks are absent from the directory, transmitting, by the node controller when in the default shared state, the one or more blocks from the memory to the second processor in a shared state without tracking the one or more blocks in the directory.

2. The method of claim 1, wherein, responsive to receiving a request from the second processor to take ownership over the one or more blocks of the range of blocks, invalidating, by the node controller when in the default shared state, the one or more blocks in each cache of the set of processors.

3. The method of claim 1, wherein responsive to receiving a further request from the second processor to read one or more further blocks of the range of blocks absent from the directory:
tracking, by the node controller when in a default invalid state, the one or more further blocks of the memory in a cache of the directory, wherein the one or more further blocks of the memory are marked as shared in the cache of the directory; and
transmitting, by the node controller when in the default invalid state, the one or more further blocks from the memory to the second processor.

4. The method of claim 3, wherein responsive to receiving the further request from the second processor: evicting, by the node controller when in the default invalid state, a different one or more blocks of memory from the cache of the directory responsive to a determination that there is not enough room in the cache of the directory to track the state of the one or more further blocks.

5. A system comprising:
a memory including a first range of memory blocks in a default shared state and a second, different range of memory blocks in a default invalid state;
a directory to track exclusive ownership of the first range of memory blocks; and
a node controller associated with the memory, where in the node controller, responsive to receiving a request from a processor to read one or more blocks of the first range:
determines whether the one or more blocks of the first range are tracked in the directory; and
responsive to a determination that the one or more block of the first range are not present in the directory, transmits the one or more blocks from the memory to the processor without tracking the one or more blocks in the directory.

6. The system of claim 5, wherein the node controller transmits the one or more blocks from the memory to the processor by sending a copy of the one or more blocks to the processor.

7. The system of claim 5, further comprising a register to specify a state of the first range of blocks, wherein the register when set to a first value specifies the first range of blocks is in the default shared state, and wherein the register when set to a second value different from the first value specifies the first range of blocks is in the default invalid state in which the node controller tracks a block of the first range of blocks responsive to a request to read the block.

8. The system of claim 7, wherein the node controller is to:
monitor a metric relating to an operation in the system; and
based on the metric satisfying a threshold, change a value in the register to switch the first range of blocks between the default shared state and the default invalid state.

9. The system of claim 8, wherein the metric is based on a count of shared memory block entries in the directory for the first range of blocks, and a count of owned memory block entries in the directory for the first range of blocks.

10. A system comprising:
a node controller associated with a memory and a first processor of a set of processors, the node controller operable to enforce cache coherency for blocks in a memory region of the memory,
wherein the node controller, when in a default shared state:
tracks exclusive ownership of a subset of the blocks of the memory region in a directory of the node controller; and
responsive to receiving a request from a second processor of the set of processors to read one or more blocks of the memory region:
determines that the one or more blocks of the memory region are absent from the directory, and
in response to determining that the one or more blocks of the memory region are absent from the directory, transmits the one or more blocks from the memory region to the second processor in a shared state without tracking the one or more blocks in the directory.

11. The system of claim 10, wherein the node controller in the default shared state, responsive to receiving a request from the second processor to take ownership over the one or more blocks of the memory region:
invalidates the one or more blocks of the memory region in each cache of the set of processors; and
updates a state in the directory for the one or more blocks of the memory region as exclusive to the second processor.

12. The system of claim 10, wherein the node controller in a default invalid state, responsive to receiving a further request from the second processor to read one or more further blocks of the memory region absent from the directory:
tracks the one or more further blocks of the memory region in a cache of the directory, wherein the one or more further blocks of the memory region are marked as shared in the cache of the directory; and
transmits the one or more further blocks to the second processor.

13. The system of claim 12, wherein the node controller in the default invalid state, responsive to receiving the further request from the second processor,
evicts different one or more blocks of the memory region from the cache of the directory responsive to a determination that there is not enough room in the cache of the directory to track the state of the one or more further blocks.

14. The system of claim 10, further comprising a register to specify a protocol to be applied to the memory region, wherein the register when set to a first value specifies an operation of the node controller in the default shared state with respect to the memory region, and wherein the register when set to a second value different from the first value specifies an operation of the node controller in a default invalid state with respect to the memory region in which the node controller tracks a block of the memory region responsive to a request to read the block.

15. The system of claim 14, wherein the node controller is to check the register and determine, based on a value stored in the register, whether the node controller is in the default shared state or the default invalid state with respect to the memory region, and wherein the node controller is to determine that the node controller is in the default shared state with respect to the memory region responsive to the register storing the first value.

16. The system of claim 15, wherein the node controller is to:
monitor a metric relating to an operation in the system; and
based on the metric satisfying a threshold, change a value in the register to switch the node controller between the default shared state and the default invalid state with respect to the memory region.

17. The system of claim 16, wherein the metric is based on a relationship of a number of memory blocks of the memory region tracked and marked by the directory as shared with respect to a number of memory blocks of the memory region tracked and marked by the directory as owned.

18. The system of claim 16, wherein the metric is based on a number of directory evictions caused by read requests for memory blocks of the memory region over a predetermined period of time.

19. The system of claim 16, wherein the metric is based on a relationship of a number of read requests received by the directory for memory blocks of the memory region with respect to a number of ownership requests received by the directory for memory blocks of the memory region in a predetermined period of time.

20. The system of claim 14, wherein the memory region is a first memory region, the register is a first register associated with the first memory region, and the memory further comprises a second memory region, and
wherein the system further comprises a second register to specify whether the node controller is to operate in the default shared state or the default invalid state with respect to the second memory region.

\* \* \* \* \*